United States Patent [19]
Nagura et al.

[11] Patent Number: 6,109,797
[45] Date of Patent: Aug. 29, 2000

[54] PLUG-JACK TYPE TRANSFER DEVICE AND PLUG-JACK TYPE OPTICAL/ELECTRICAL COMPATIBLE TRANSFER DEVICE

[75] Inventors: Kazuhito Nagura, Kashihara; Takatoshi Mizoguchi, Gojo; Hideki Miyuki; Takehisa Ishihara, both of Yamatokoriyama, all of Japan

[73] Assignee: Sharp Kabushiki Kaisha, Osaka, Japan

[21] Appl. No.: 09/173,626

[22] Filed: Oct. 16, 1998

[30] Foreign Application Priority Data

Oct. 16, 1997 [JP] Japan ................................ 9-283516

[51] Int. Cl.⁷ ...................................................... G02B 6/36
[52] U.S. Cl. ................................. 385/88; 439/669; 385/92
[58] Field of Search ................................. 439/188, 668, 439/669; 385/88–94

[56] References Cited

U.S. PATENT DOCUMENTS

| | | | |
|---|---|---|---|
| 4,840,451 | 6/1989 | Sampson et al. | 350/96.2 |
| 5,228,105 | 7/1993 | Glista | 385/89 |
| 5,266,042 | 11/1993 | Hampel | 439/188 |
| 5,669,779 | 9/1997 | Galloway et al. | 439/188 |
| 5,895,294 | 4/1999 | Delangis et al. | 439/669 |

FOREIGN PATENT DOCUMENTS

| | | |
|---|---|---|
| 58-111008 | 7/1983 | Japan . |
| 62-193208 | 12/1987 | Japan . |
| 63-128506 | 8/1988 | Japan . |
| 2-31735 | 8/1990 | Japan . |
| 3-13989 | 3/1991 | Japan . |
| 06140106 | 5/1994 | Japan . |

*Primary Examiner*—Hung N. Ngo
*Attorney, Agent, or Firm*—Dike, Bronstein, Roberts & Cushman, LLP; David G. Conlin

[57] ABSTRACT

A plug-jack type transfer device includes: at least seven electric terminals for connecting a mini single-head electric plug to the transfer device and exchanging an electrical signal therewith; a container body for containing and supporting the electric terminals and receiving the mini single-head electric plug; and a switch mechanism which completes electrical connection between a fourth electric terminal and a sixth electric terminal when the mini single-head electric plug is inserted into the container body. The mini single-head electric plug includes at least seven regions. A region farthest from a plug tip electrode corresponds to a first region. When the mini single-head electric plug is inserted, a first electric terminal comes in contact with the first region; a second electric terminal with a seventh region; a third electric terminal with a fifth region; the fourth electric terminal with a third region; a fifth electric terminal with the third region; and a seventh electric terminal with the first region. The first, fourth, and fifth electric terminals are coupled to a power level via respective resistors, and the sixth and the seventh electric terminals are grounded.

11 Claims, 10 Drawing Sheets

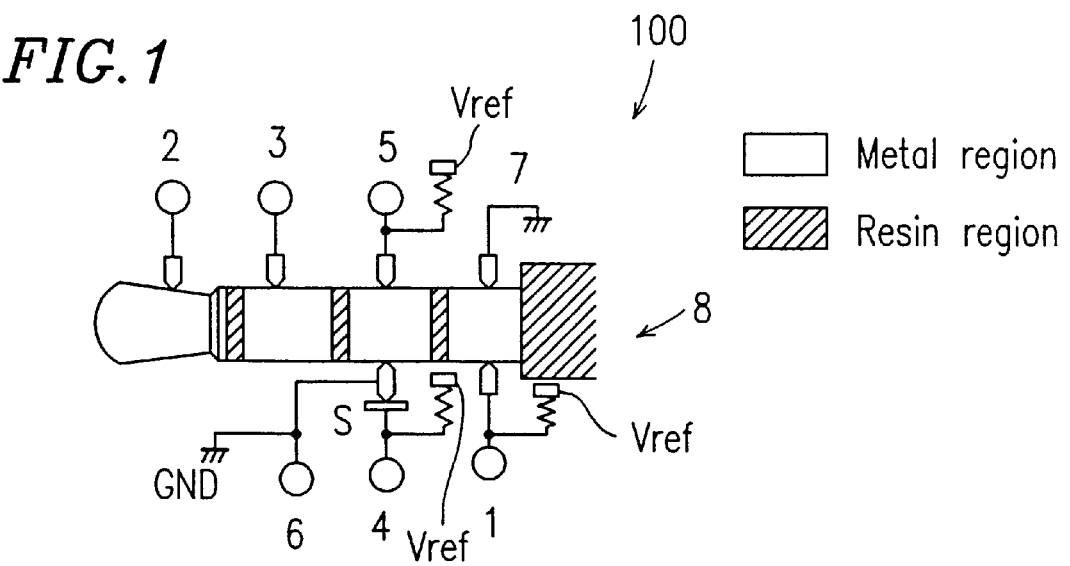
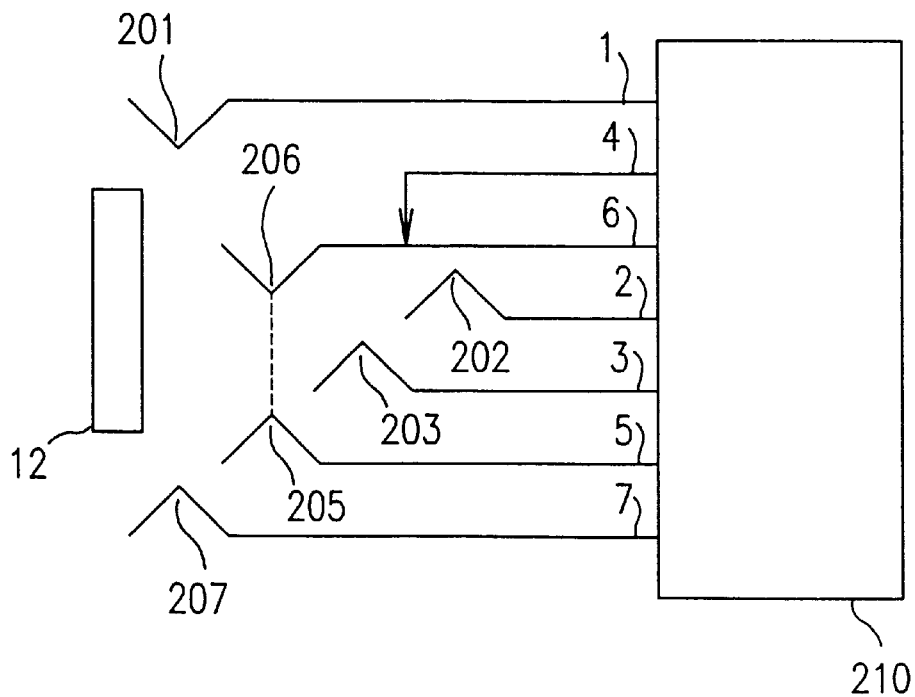

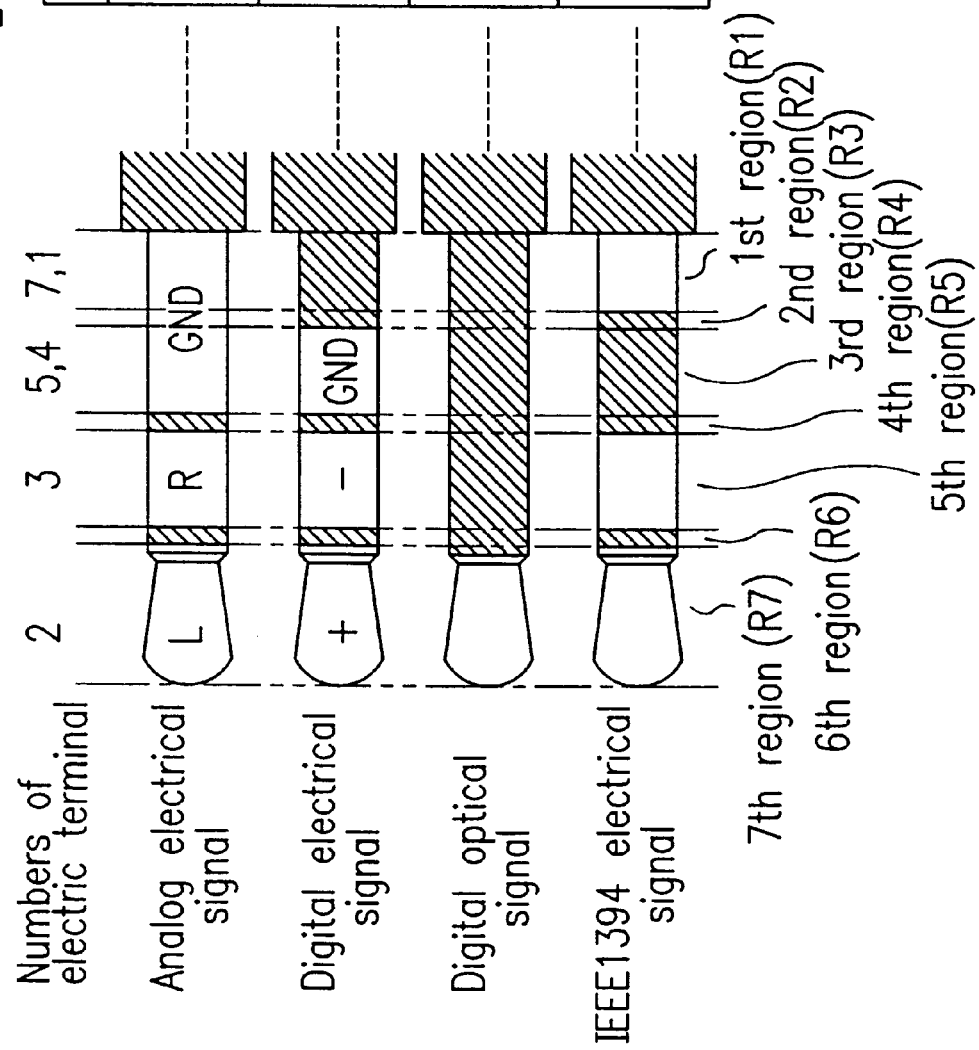

FIG. 4

| Plug type | Terminal outputs | | |
|---|---|---|---|
| | 4 | 5 | 1 |
| Analog electrical signal | L | L | L |
| Digital electrical signal | L | L | H |
| Digital optical signal | L | H | H |
| IEEE1394 electrical signal | L | H | L |
| No plug | H | H | H |

PLUG-JACK TYPE TRANSFER DEVICE AND PLUG-JACK TYPE OPTICAL/ELECTRICAL COMPATIBLE TRANSFER DEVICE

BACKGROUND OF THE INVENTION

1. Field of the Invention

The present invention relates to a plug-jack type optical/electrical compatible transfer device used for the transfer of data between digital audio apparatuses (e.g., CD (compact disk), MD (mini disk), or DAT (digital audio tape)) or other apparatuses capable of transferring digital signals representing audio/visual information, control information, letters or characters, detected parameter values, image information or the like.

2. Description of the Related Art

Japanese Laid-open Patent Publication No. 6-140106 discloses a plug-jack type optical/electrical compatible transfer device which is capable of transferring three kinds of signals, i.e., digital electrical signals, analog electrical signals, and optical signals from an audio interface. On the other hand, Japanese Laid-open Patent Publication No. 58-111008, Japanese Laid-open Utility Model Publication No. 62-193208, Japanese Laid-open Utility Model Publication No. 63-128506, Japanese National Utility Model Publication No. 2-31735, and Japanese National Utility Model Publication No. 3-13989 each discloses a plug.

However, none of the above publications discloses a transfer device which accepts both a traditional plug and a plug for connection with a non-traditional digital interface and enables exchange of both traditional data and non-traditional digital data via such plugs.

SUMMARY OF THE INVENTION

A plug-jack type transfer device according to the present invention includes: at least seven electric terminals for connecting a mini single-head electric plug to the transfer device and exchanging an electrical signal with the mini single-head electrical plug; a container body for containing and supporting the at least seven electric terminals and receiving the mini single-head electric plug; and a switch mechanism which completes electrical connection between a fourth electric terminal and a sixth electric terminal of the at least seven electric terminals when the mini single-head electric plug is inserted into the container body, wherein the mini single-head electric plug is divided into at least seven regions such that a region farthest from a plug tip electrode corresponds to a first region, and when the mini single-head electric plug is inserted into the container body, a first electric terminal comes in contact with the first region; a second electric terminal comes in contact with a seventh region; a third electric terminal comes in contact with a fifth region; the fourth electric terminal comes in contact with a third region; a fifth electric terminal comes in contact with the third region; and a seventh electric terminal comes in contact with the first region, the first, fourth, and fifth electric terminals being coupled to a power level via respective resistors, and the sixth and the seventh electric terminals being grounded.

A plug-jack type optical/electrical compatible transfer device according to the present invention includes: at least seven electric terminals for connecting one of a mini single-head electric plug and an optical fiber plug to the transfer device and exchanging an electrical signal with the one plug; a photosemiconductor for interfacing with the one plug and exchanging an optical signal with the one plug; a container body for containing and supporting the at least seven electric terminals and the photosemiconductor and the one plug; and a switch mechanism which completes electrical connection between a fourth electric terminal and a sixth electric terminal of the at least seven electric terminals when the one plug is inserted into the container body, wherein the mini single-head electric plug is divided into at least seven regions such that a region farthest from a plug tip electrode corresponds to a first region, and when the one plug connected to the transfer device is inserted into the container body, a first electric terminal comes in contact with the first region; a second electric terminal comes in contact with a seventh region; a third electric terminal comes in contact with a fifth region; the fourth electric terminal comes in contact with a third region; a fifth electric terminal comes in contact with the third region; and a seventh electric terminal comes in contact with the first region, the first, fourth, and fifth electric terminals being coupled to a power level via respective resistors, and the sixth and the seventh electric terminals being grounded.

In one embodiment of the invention, the mini single-head electric plug is one of a plug for transferring analog electrical signals, a plug for transferring digital electrical signals, and a plug for transferring IEEE1394 electrical signals.

In one embodiment of the invention, the mini single-head electric plug is one of a plug for transferring analog electrical signals, a plug for transferring digital electrical signals, and a plug for transferring IEEE1394 electrical signals, and wherein the optical fiber plug is a plug for transferring audio interface optical signals.

In another embodiment of the invention, the mini single-head electric plug corresponds to a seven-digit code in which first through seventh bits of the seven-digit code respectively represent the first through seventh regions, the plug tip electrode and conductive regions of the mini single-head electric plug being designated as "1", and insulative regions of the mini single-head electric plug being designated as "0", such that a mini single-head electric plug for transferring analog electrical signals corresponds to (1010111), a mini single-head electric plug for transferring digital electrical signals corresponds to (1010100), and a mini single-head electric plug for transferring non-traditional digital electrical signals corresponds to (1010001).

In another embodiment of the invention, the one plug corresponds to a seven-digit code in which first through seventh bits of the seven-digit code respectively represent the first through seventh regions, the plug tip electrode and conductive regions of the one plug being designated as "1", and insulative regions of the one plug being designated as "0", the one plug, when configured for transferring analog electrical signals, corresponds to (1010111); the one plug, when configured for transferring digital electrical signals, corresponds to (1010100); the one plug, when configured for transferring audio interface optical signals, corresponds to (1000000); and the one plug, when configured for transferring non-traditional electrical signals, corresponds to (1010001).

In still another embodiment of the invention, the first through sixth regions are ring-shaped.

In still another embodiment of the invention, the optical fiber plug has a shape which is substantially the same as the shape of the mini single-head electric plug.

In still another embodiment of the invention, the photosemiconductor is a photodiode.

In still another embodiment of the invention, the photosemiconductor is a phototransistor.

Thus, the invention described herein makes possible the advantage of providing a plug-jack type optical/electrical compatible transfer device which accepts both a plug for use in traditional audio interface and a plug for use in a non-traditional digital interface and enables exchange of data with the traditional audio interface and/or the non-traditional digital interface.

This and other advantages of the present invention will become apparent to those skilled in the art upon reading and understanding the following detailed description with reference to the accompanying figures.

BRIEF DESCRIPTION OF THE DRAWINGS

FIG. 1 is a diagram showing electric terminals 1 to 7 of a plug-jack type optical/electrical compatible transfer device according to the present invention.

FIG. 2 is a circuit diagram showing the connections of the electric terminals 1 to 7 shown in FIG. 1.

FIG. 3A is a diagram showing various plugs which may be used in accordance with the present invention.

FIG. 3B is a table showing the input/output specification of each of the plugs shown in FIG. 3A.

FIG. 4 is a table showing the relationship between various types of insertable plugs and the electric terminals 4, 5 and 1 shown in FIG. 3A.

DESCRIPTION OF THE PREFERRED EMBODIMENTS

Figure 5:
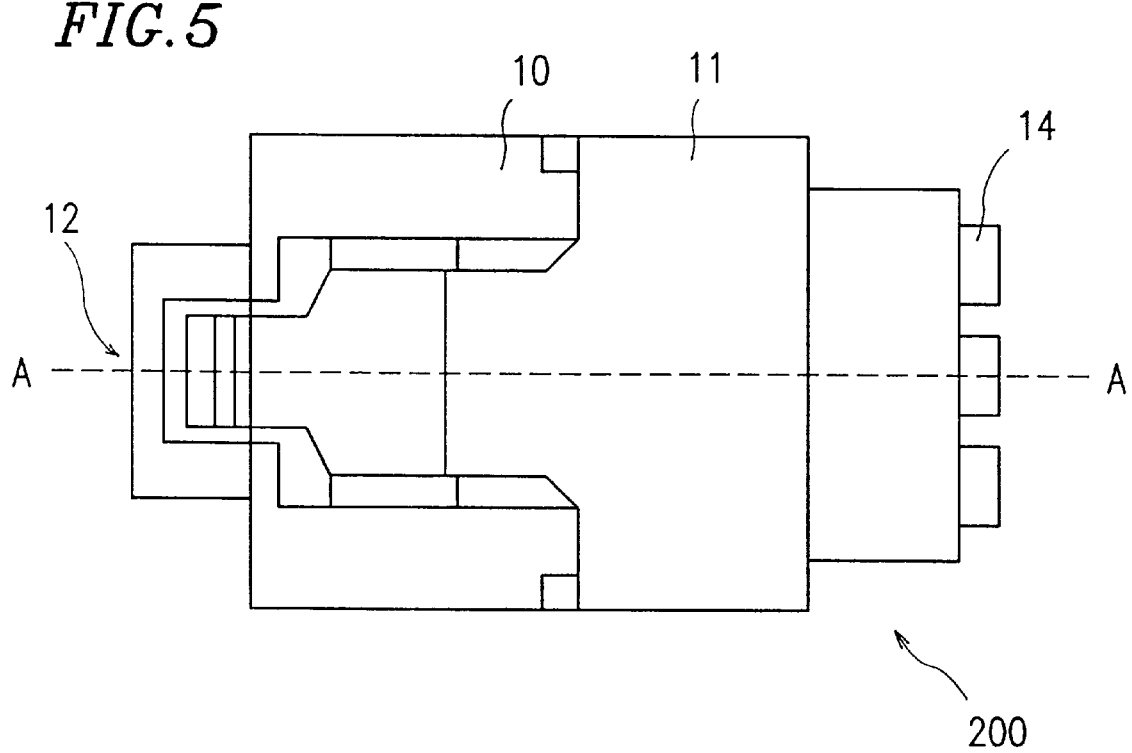
FIG. 5 is a plan view of a transfer device 200 according to the present invention.

Hereinafter, the plug-jack type optical/electrical compatible transfer device according to the present invention will be described by way of examples, with reference to FIGS. 1 to 11.

FIG. 1 is a diagram showing electric terminals 1, 2, 3, 4, 5, 6, and 7 of a plug-jack type optical/electrical compatible transfer device 100 according to the present invention.

The electric terminals 1 to 7 of the transfer device 100 are coupled to an inserted plug 8 as shown in FIG. 1. The transfer device 100 is capable of identifying the type of inserted plug 8 based on the potentials of the electric terminals 1 to 7.

In the plug 8 illustrated in FIG. 1, white regions represent metal portions (i.e., conductive ring regions), and hatched regions represent resin portions (i.e., insulative ring regions).

FIG. 2 is a circuit diagram showing the connections of the electric terminals 1 to 7. Reference numeral 12 denotes a side view of an aperture through which a plug (not shown) may be inserted. Plug interface portions 201, 202, and 203 correspond to electric terminals 1 to 3, respectively, and plug interface portions 205, 206, and 207 correspond to electric terminals 5 to 7, respectively. The relative positions of the electric terminals 1 to 7 are as shown in FIG. 2. The transfer device 100 includes a determination section 210 coupled to the electric terminals 1 to 7 for determining the type of plug inserted in the transfer device 100.

Types of plugs contemplated in the present invention include at least the following: plugs for transferring analog electrical signals; plugs for transferring digital electrical signals; plugs for transferring digital optical signals (plugs for transferring audio interface optical signals); and plugs for transferring non-traditional digital electrical signals.

Herein, non-traditional digital electrical signals include, for example, IEEE1394 electrical signals (described later).

Plugs for transferring analog electrical signals; plugs for transferring digital electrical signals; and plugs for transferring IEEE1394 electrical signals are classified as mini single-head electric plugs. Plugs for transferring digital optical signals (plugs for transferring audio interface optical signals) are classified as optical fiber plugs.

FIG. 3A is a diagram showing the aforementioned types of plugs. FIG. 3B is a table showing the input/output specification of each of the plugs shown in FIG. 3A.

Hereinafter, the relationship between various types of plugs and their conductive regions and insulative regions will be described by way of seven-digit codes.

As shown in FIG. 3A, each plug is divided into a series of seven regions R1, R2, R3, R4, R5, R6, and R7, where an electrode constituting a tip of the plug (hereinafter referred to as "the plug tip electrode") corresponds to the seventh region R7, and the region farthest from the plug tip electrode R7 corresponds to a first region R1, and second to sixth regions R2 to R6 are spaced therebetween.

According to the present invention, each region on each plug has a corresponding bit value associated therewith. In particular, the first through seventh bits respectively represent the first through seventh regions of a plug. The plug tip electrode R7 and any conductive region of the plug have a bit value of "1", whereas any insulative regions of the plug have a bit value of "0". Thus, a plug for transferring analog electrical signals can be represented by the code (1010111); a plug for transferring digital electrical signals can be represented by the code (1010100); a plug for transferring audio interface optical signals can be represented by the code (1000000); and plugs for and a plug for transferring IEEE1394 electrical signals can be represented by the code (1010001). Thus, each bit of each code represents a corresponding region of the plug in question.

When a plug is inserted in the transfer device 100, the first electric terminal 1 comes in contact with the first region R1 of the plug; the second electric terminal 2 comes in contact with the seventh region R7 of the plug; the third electric terminal 3 comes in contact with the fifth region R5 of the plug; the fourth electric terminal 4 comes in contact with the third region R3 of the plug; the fifth electric terminal 5 comes in contact with the third region R3 of the plug; and the seventh electric terminal 7 comes in contact with the first region R1 of the plug.

Based on the aforementioned code representation of plugs and the relationship between the respective regions R1 to R7 of each plug and the electric terminals 1 to 3 and 5 to 7, it would be possible to similarly represent the electric terminals 1 to 7 using a similar coding scheme. That is, the electric terminal 2 corresponds to the code (1000000);

the electric terminal 3 corresponds to the code (0010000);

the electric terminal 5 corresponds to the code (0000100);

the electric terminal 6 corresponds to the code (0000100);

the electric terminal 7 corresponds to the code (0000001); and the electric terminal 1 corresponds to the code (0000001).

The electric terminals 2, 3, 5, and 7 may be disposed in an upper row, and the electric terminals 6, 4, and 1 may be disposed in a lower row, as illustrated in FIG. 1. However, the arrangement of the respective electric terminals 1 to 7 is not limited to this configuration.

In the illustrated example of FIG. 1, the electric terminals 5, 4, and 1 are coupled to a power level Vref via respective resistors, and the electric terminals 7 and 6 are coupled to GND, i.e., grounded. The electric terminal 6 is coupled to or uncoupled from the electric terminal 4 via a switch mechanism S which closes its associated electrical circuit upon insertion of a plug 8. That is, the electrical connection between the electric terminal 6 and the electric terminal 4 is open when no plug 8 is inserted, and is closed when a plug 8 is inserted.

FIG. 4 is a table showing the relationship between various types of insertable plugs and the electric terminals 4, 5 and 1. In FIG. 4, "H" represents a high level, and "L" represents a low level.

Hereinafter, it will be described how the levels of the electric terminals 4, 5, and 1 are determined in an exemplary case where a plug for transferring IEEE1394 electrical signals (which corresponds to the code "1010001" as mentioned above) is inserted in the transfer device 100.

Due to the insertion of the plug 8, the electric terminal 4 is electrically connected with the electric terminal 6 via the switch mechanism S. Therefore, the electric terminal 4 is grounded via the grounded electric terminal 6. As a result, the level of the electric terminal 4 is maintained at the "L" level regardless of whether the corresponding region of the IEEE1394 electrical signals is conductive or insulative.

The electric terminal 5 is coupled to an insulative region of the plug for transferring IEEE1394 electrical signals. Since the electric terminal 5 is coupled to the power level Vref via a resistor, the electric terminal 5 is maintained at the "H" level.

The electric terminal 1 is coupled to a conductive region of the plug for transferring IEEE1394 electrical signals. Although the electric terminal 1 is coupled to the power level Vref via a resistor, the electric terminal 1 is grounded via a conductive region of the plug for transferring IEEE1394 electrical signals and the electric terminal 7. As a result, the electric terminal 1 is maintained at the "L" level.

The determination section 210 includes a table shown in FIG. 4, and is capable of determining whether or not a plug is inserted, as well as the type of any inserted plug, based on the signals from the electric terminals 4, 5, and 1.

For example, if the levels of the electric terminals 4, 5, and 1 are all "L", the determination section 210 determines the inserted plug to be a plug for transferring analog electrical signals.

As described above, if the levels of the electric terminals 4, 5, and 1 are "L", "L", and "H", respectively, the determination section 210 determines the inserted plug to be a plug for transferring digital electrical signals.

If the levels of the electric terminals 4, 5, and 1 are "L", "H", and "H", respectively, the determination section 210 determines the inserted plug to be a plug for transferring digital optical signals.

If the levels of the electric terminals 4, 5, and 1 are "L", "H", and "L", respectively, the determination section 210 determines the inserted plug to be a plug for transferring IEEE1394 electrical signals.

If the levels of the electric terminals 4, 5, and 1 are all "H", the determination section 210 determines that there is no inserted plug.

Hereinafter, the principle by which the transfer device 100 according to the present example is capable of determining the type of inserted plug without affecting the transfer of signals will be described with reference to the following traditional plugs: a plug for transferring analog electrical signals (which corresponds to the code "1010111"), a plug for transferring digital electrical signals (which corresponds to the code "1010100"), and a plug for transferring audio interface optical signals (which corresponds to the code "1000000", for example.

The farthest region R1 from the plug tip electrode R7 of a plug for transferring analog electrical signals (which corresponds to the code "1010111") is a conductive region which is grounded. When such a plug for transferring analog electrical signals is inserted into the transfer device 100, the conductive first region R1 of the plug is coupled to the grounded electric terminal 7. Therefore, the insertion of the transfer device 100 does not electrically affect the plug determination or the signal transfer.

The farthest region R1 from the plug tip electrode R7 of a plug for transferring digital electrical signals (which corresponds to the code "1010100") is an insulative region. When such a plug for transferring digital electrical signals is inserted into the transfer device 100, the insulative first region R1 of the plug does not electrically affect the transfer device 100 in any way.

The farthest region R1 from the plug tip electrode R7 of a plug for transferring audio interface optical signals (which corresponds to the code "1000000") is an insulative region. When such a plug for transferring audio interface optical signals is inserted into the transfer device 100, the insulative first region R1 of the plug does not electrically affect the transfer device 100 in any way.

Although the aforementioned embodiment of the present invention illustrates an arrangement including seven electric terminals, more than seven electric terminals may similarly be used according to the present invention.

FIGS. 5 to 8 show an exemplary structure of a plug-jack type optical/electrical compatible transfer device 200 according to the present invention.

Figure 6:
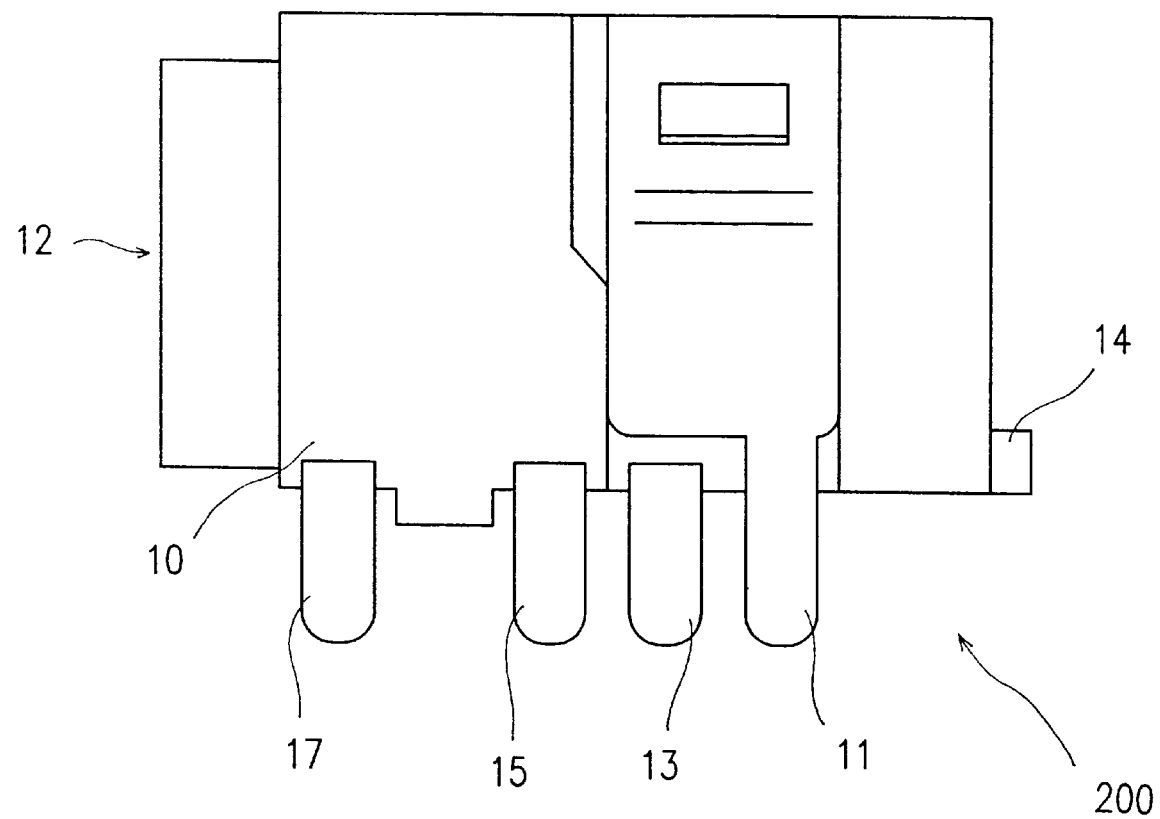
FIG. 6 is a side view of the transfer device 200 of FIG. 5.

FIGS. 5 and 6 are a plan view and a side view, respectively, showing the transfer device 200. The transfer device 200 includes a container body 10, an insertion hole 12 for inserting a plug therethrough, external connectors 11, 13, 14, 15, and 17. The external connector 11 also serves as part of the container body.

Figure 7:
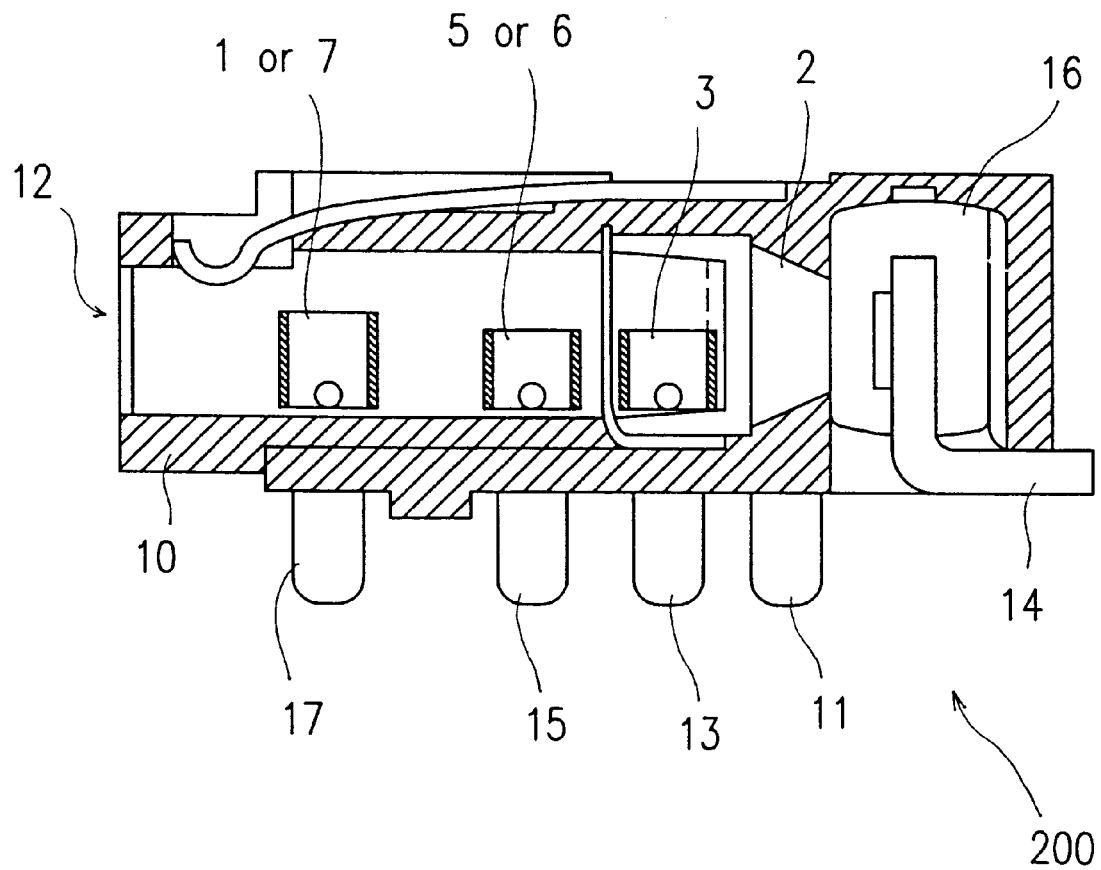
FIG. 7 is a cross-sectional view of the transfer device 200 of FIG. 5 taken at line A—A.

FIG. 7 is a cross-sectional view of the transfer device 200 of FIG. 5 taken at line A—A.

The transfer device 200 includes the electric terminals 1 to 7 as shown in FIG. 1, as well as a photosemiconductor 16, which may be a light emission section or a light receiving section. The below discussion illustrates the case where the photosemiconductor 16 is a light emission section.

The external connector 11 is coupled to the electric terminal 2; the external connector 13 is coupled to the electric terminal 3; the external connector 15 is coupled to the electric terminal 5 or 6; and the external connector 17 is coupled to the electric terminal 1 or 7; and the external connector 14 is coupled to the light emission section 16. The light emission section 16 is coupled to an optical fiber cable (not shown) via an optical plug which is inserted into the plug insertion hole 12 in the container body 10 so as to enable exchange of audio optical signals. The photosemiconductor may be a photodiode, a phototransistor, or the like.

Hereinafter, the details of the light emission section 16 are described with reference to FIGS. 8A and 8B.

Figure 8A:
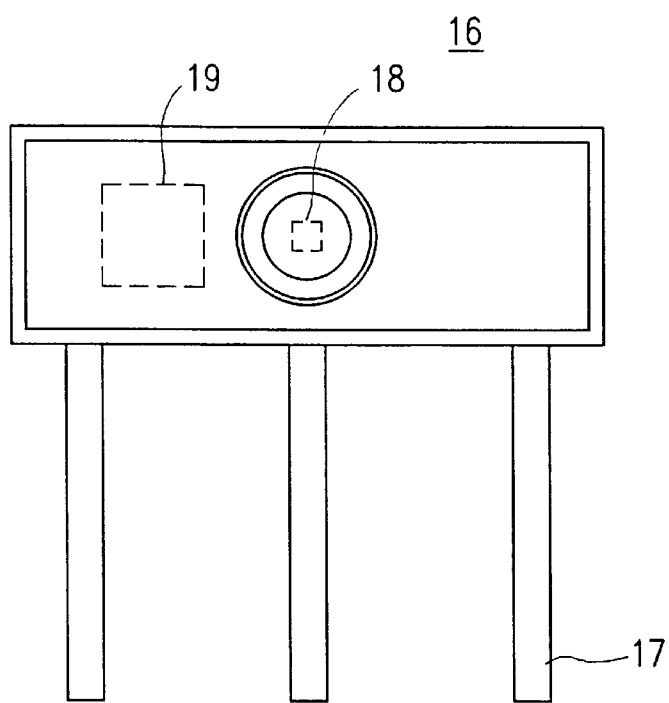
FIG. 8A is a front view of a light emission section 16 according to the present invention.
Figure 8B:
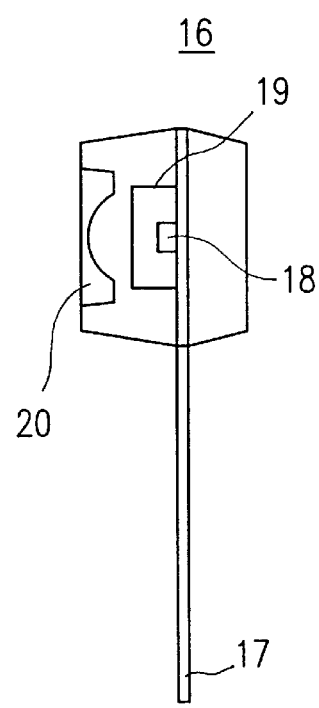
FIG. 8B is a side view of the light emission section 16 shown in FIG. 8A.

FIGS. 8A and 8B are a front view and a side view, respectively, showing the light emission section 16.

The light emission section 16 includes a semiconductor light emitter chip 18 formed on a lead frame 17, an integrated circuit chip 19 incorporating driving circuitry and other elements for driving the semiconductor light emitter chip 18, and a lens 20 for converging the light (representing information to be transmitted) which is emitted from the semiconductor light emitter chip 18.

The light emission section 16 can be produced as follows. The semiconductor light emitter chip 18 and the integrated circuit chip 19 are die-bonded on the lead frame 17. Thereafter, electrodes of the semiconductor light emitter chip 18 and the integrated circuit chip 19 are electrically connected to the lead frame 17 as appropriate (by wire-bonding, etc.), and the entire composite is sealed within transparent resin except for the lens 20, which is left to be exposed on the surface of the transparent resin. Thus, light exiting the lens 20 is incident on an optical fiber (not shown).

Although a light emission section is described above, the photosemiconductor 16 may be implemented as a light receiving section, which can be realized by modifying the light emission section such that a semiconductor light-sensitive chip is provided instead of the semiconductor light emitter chip 18 and an integrated circuit chip incorporating an amplifier circuit is provided instead of the integrated circuit chip 19.

Figure 9:
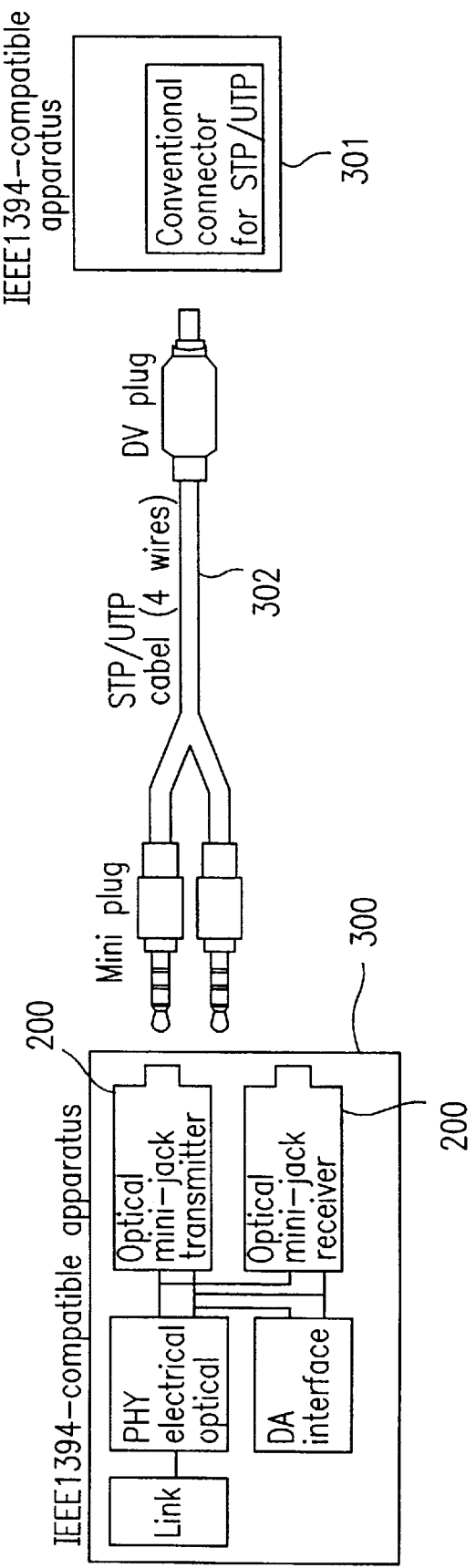
FIG. 9 is a diagram illustrating a plug-jack type optical/electrical compatible transfer device according to one example of the present invention where it is applied to IEEE1394-compatible apparatuses.

FIG. 9 illustrates interconnection between two IEEE1394-compatible apparatuses, e.g., a personal computer 300 and a digital cam coder 301. The digital cam coder 301 includes an IEEE1394-compatible connector (which is currently referred to as a DV terminal), so it can be coupled to the plug-jack type optical/electrical compatible transfer device 200 of the present invention by using a conversion cable as illustrated.

As shown in FIG. 9, the IEEE1394-compatible apparatus 300 includes a LINK section, a PHY Electrical Optical section, a DA (digital to analog) interface, an optical mini-jack transmitter, an optical mini-jack receiver (serving as the transfer device) 200, and other necessary elements. An IEEE1394-compatible connector cable 302 includes two mini plugs, an STP/UTP cable (including 4 wires), and a DV plug. The other IEEE1394-compatible apparatus 301 includes a conventional connector for STP/UPT and other necessary elements.

Figure 10:
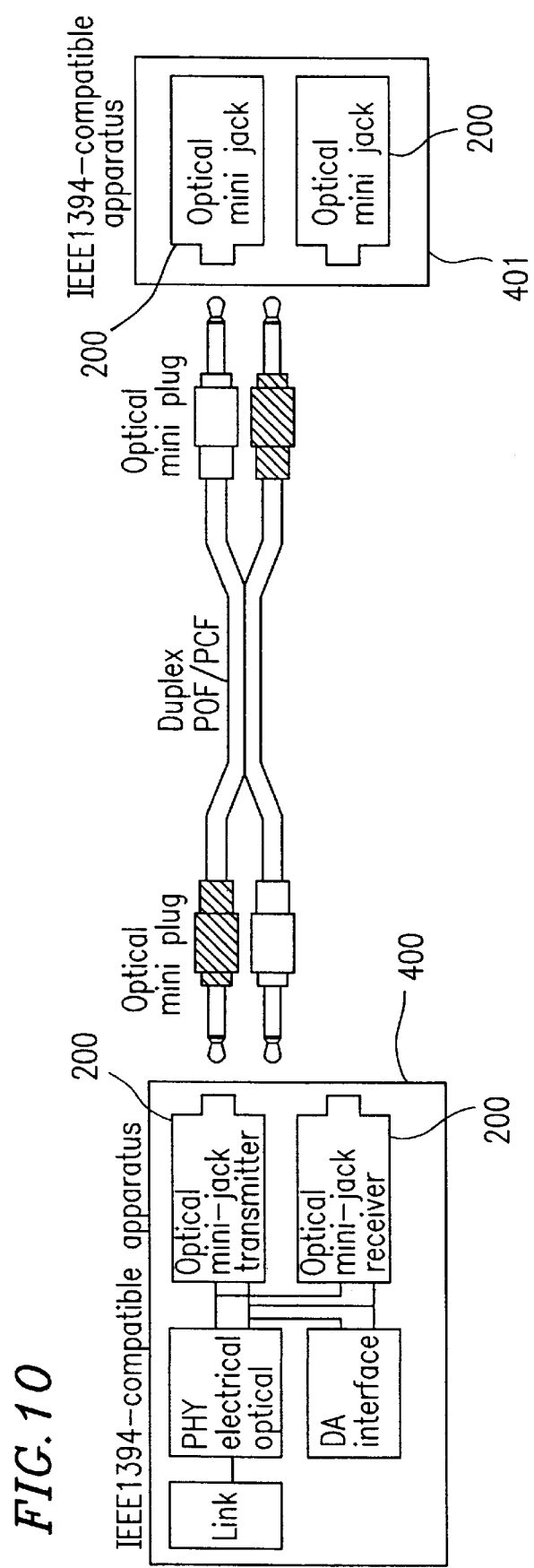
FIG. 10 is a diagram illustrating a plug-jack type optical/electrical compatible transfer device according to another example of the present invention used for coupling two IEEE1394-compatible apparatuses, e.g., two workstations.

FIG. 10 illustrates interconnection between two IEEE1394-compatible apparatuses, e.g., workstations 400 and 401. It will be appreciated that the use of an electric connection would only enable connection over a relatively short distance due to noise-related constraints and the like. On the other hand, the plug-jack type optical/electrical compatible transfer device 200 according to the present invention enables the use of an optical connection and hence data transfer over a long distance.

Figure 11:
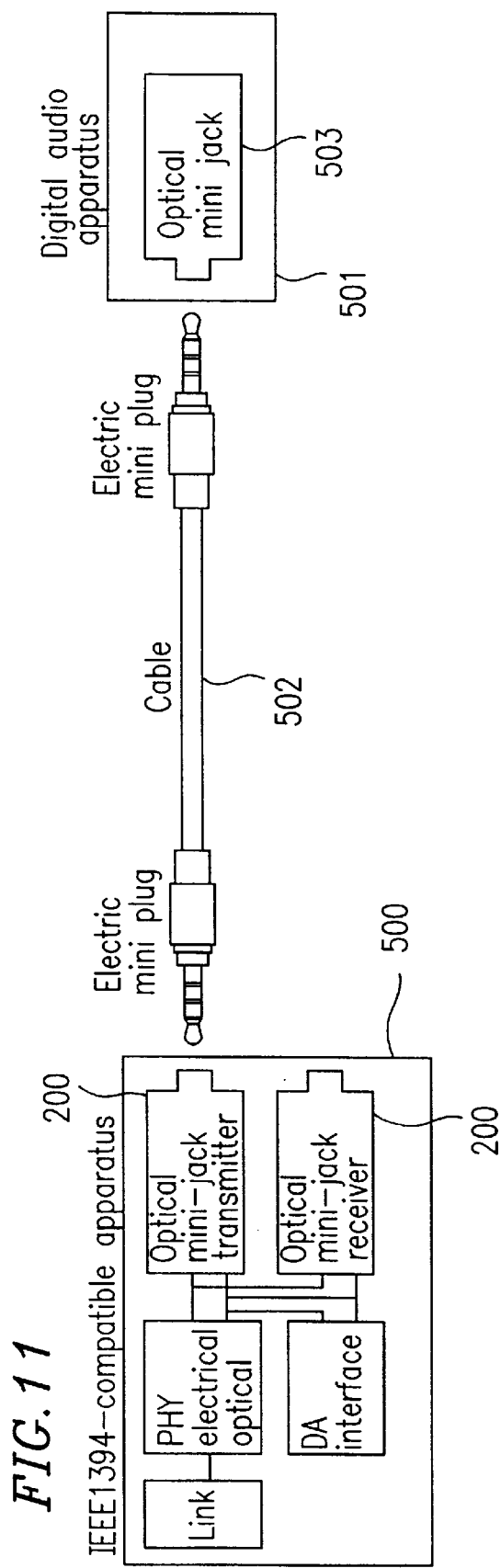
FIG. 11 is a diagram illustrating a plug-jack type optical/electrical compatible transfer device according to still another example of the present invention used for coupling an IEEE1394-compatible personal computer and a digital audio apparatus (IEEE1394-compatible or otherwise).

FIG. 11 illustrates interconnection between an IEEE1394-compatible personal computer 500 and a digital audio apparatus 503 (IEEE1394-compatible or otherwise). Since the IEEE1394 transfer rate is faster, e.g., 100 Mbps, than that of traditional digital audio interfaces, the present invention makes it possible to transfer high-quality music information, for example, via this connection. Alternatively, by employing a conventional digital optical signal cable as a cable 502 shown in FIG. 11, it becomes possible to couple a digital audio apparatus having a conventional plug-jack type optical/electrical compatible transfer device to the personal computer 500 via a DA interface included in the hardware of the personal computer 500. This ability is provided by the lower compatibility of the inventive plug-jack type optical/electrical compatible transfer device 200 to accommodate such a conventional plug-jack type optical/electrical compatible transfer device.

Thus, the plug-jack type transfer device according to the present invention accepts both traditional plugs and non-traditional digital interfaces so as to enable exchange of data via such plugs.

Similarly, the plug-jack type optical/electrical compatible transfer device according to the present invention accepts both traditional plugs and non-traditional digital interfaces so as to enable exchange of data via such plugs.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A plug-jack type transfer device comprising:

at least seven electric terminals for connecting a mini single-head electric plug to the transfer device and exchanging an electrical signal with the mini single-head electrical plug;

a container body for containing and supporting the at least seven electric terminals and receiving the mini single-head electric plug; and a switch mechanism which completes electrical connection between a fourth electric terminal and a sixth electric terminal of the at least seven electric terminals when the mini single-head electric plug is inserted into the container body, wherein the mini single-head electric plug is divided into at least seven regions such that a region farthest from a plug tip electrode corresponds to a first region, and when the mini single-head electric plug is inserted into the container body, a first electric terminal comes in contact with the first region; a second electric terminal comes in contact with a seventh region; a third electric terminal comes in contact with a fifth region; the fourth electric terminal comes in contact with a third region; a fifth electric terminal comes in contact with the third region; and a seventh electric terminal comes in contact with the first region, the first, fourth, and fifth electric terminals being coupled to a power level via respective resistors, and the sixth and the seventh electric terminals being grounded.

2. A plug-jack type transfer device according to claim 1, wherein the mini single-head electric plug is one of a plug for transferring analog electrical signals, a plug for transferring digital electrical signals, and a plug for transferring IEEE1394 electrical signals.

3. A plug-jack type transfer device according to claim 1, wherein, the mini single-head electric plug corresponds to a seven-digit code in which first through seventh bits of the seven-digit code respectively represent the first through seventh regions, the plug tip electrode and conductive regions of the mini single-head electric plug being designated as "1", and insulative regions of the mini single-head electric plug being designated as "0", such that a mini single-head electric plug for transferring analog electrical signals corresponds to (1010111), a mini single-head electric plug for transferring digital electrical signals corresponds to (1010100), and a mini single-head electric plug for transferring non-traditional digital electrical signals corresponds to (1010001).

4. A plug-jack type transfer device according to claim 1, wherein the first through sixth regions are ring-shaped.

5. A plug-jack type optical/electrical compatible transfer device comprising:

at least seven electric terminals for connecting one of a mini single-head electric plug and an optical fiber plug to the transfer device and exchanging an electrical signal with the one plug;

a photosemiconductor for interfacing with the one plug and exchanging an optical signal with the one plug;

a container body for containing and supporting the at least seven electric terminals and the photosemiconductor and the one plug; and a switch mechanism which completes electrical connection between a fourth electric terminal and a sixth electric terminal of the at least seven electric terminals when the one plug is inserted into the container body, wherein the mini single-head electric plug is divided into at least seven regions such that a region farthest from a plug tip electrode corresponds to a first region, and when the one plug connected to the transfer device is inserted into the container body, a first electric terminal comes in contact with the first region; a second electric terminal comes in contact with a seventh region; a third electric terminal comes in contact with a fifth region; the fourth electric terminal comes in contact with a third region; a fifth electric terminal comes in contact with the third region; and a seventh electric terminal comes in contact with the first region, the first, fourth, and fifth electric terminals being coupled to a power level via respective resistors, and the sixth and the seventh electric terminals being grounded.

6. A plug-jack type optical/electrical compatible transfer device according to claim 5, wherein the mini single-head electric plug is one of a plug for transferring analog electrical signals, a plug for transferring digital electrical signals, and a plug for transferring IEEE1394 electrical signals, and wherein the optical fiber plug is a plug for transferring audio interface optical signals.

7. A plug-jack type optical/electrical compatible transfer device according to claim 5, wherein, the one plug corresponds to a seven-digit code in which first through seventh bits of the seven-digit code respectively represent the first through seventh regions, the plug tip electrode and conductive regions of the one plug being designated as "1", and insulative regions of the one plug being designated as "0", the one plug, when configured for transferring analog electrical signals, corresponds to (1010111); the one plug, when configured for transferring digital electrical signals, corresponds to (1010100); the one plug, when configured for transferring audio interface optical signals, corresponds to (1000000); and the one plug, when configured for transferring non-traditional electrical signals, corresponds to (1010001).

8. A plug-jack type optical/electrical compatible transfer device according to claim 5, wherein the first through sixth regions are ring-shaped.

9. A plug-jack type optical/electrical compatible transfer device according to claim 5, wherein the optical fiber plug has a shape which is substantially the same as the shape of the mini single-head electric plug.

10. A plug-jack type optical/electrical compatible transfer device according to claim 5, wherein the photosemiconductor is a photodiode.

11. A plug-jack type optical/electrical compatible transfer device according to claim 5, wherein the photosemiconductor is a phototransistor.

\* \* \* \* \*